US012699654B2

(12) United States Patent

Biederman

(10) Patent No.: US 12,699,654 B2

(45) Date of Patent: Aug. 4, 2026

(54) PACKET PROCESSING DEVICE TO DETERMINE MEMORY TO STORE DATA IN A SERVER ARCHITECTURE AND COMPUTING SYSTEM INCLUDING SAME

(71) Applicant: Intel Corporation, Santa Clara, CA (US)

(72) Inventor: Daniel Christian Biederman, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/847,851

(22) Filed: Jun. 23, 2022

(65) Prior Publication Data

US 2022/0327061 A1 Oct. 13, 2022

(51) Int. Cl.
| | |
|---|---|
| *G06F 12/08* | (2016.01) |
| *G06F 12/0811* | (2016.01) |
| *G06F 12/0897* | (2016.01) |
| *H04L 47/10* | (2022.01) |
| *H04L 69/22* | (2022.01) |

(52) U.S. Cl.
CPC ...... *G06F 12/0897* (2013.01); *G06F 12/0811* (2013.01); *H04L 47/10* (2013.01); *H04L 69/22* (2013.01)

(58) Field of Classification Search
CPC ... G06F 12/0897; G06F 12/0811; H04L 47/10
See application file for complete search history.

(56) References Cited

U.S. PATENT DOCUMENTS

| | | | |
|---|---|---|---|
| 10,362,149 B2 | 7/2019 | Biederman et al. | |
| 10,599,498 B2 | 3/2020 | Nakaike et al. | |
| 2003/0191916 A1* | 10/2003 | McBrearty | G06F 11/1464 |
| | | | 711/112 |
| 2009/0144499 A1* | 6/2009 | Nicholson | G06F 3/0689 |
| | | | 711/E12.001 |
| 2019/0004594 A1 | 1/2019 | Kim et al. | |
| 2019/0043050 A1 | 2/2019 | Smith et al. | |
| 2021/0110328 A1 | 4/2021 | Hsiao et al. | |
| 2021/0117249 A1 | 4/2021 | Doshi et al. | |

(Continued)

FOREIGN PATENT DOCUMENTS

| | | |
|---|---|---|
| KR | 1020160040439 A | 4/2016 |

OTHER PUBLICATIONS

PCT International Search Report and Written Opinion issued in PCT/US2023/022287, dated Sep. 11, 2023; 10 pages.

(Continued)

*Primary Examiner* — Jae U Yu

(74) *Attorney, Agent, or Firm* — Alliance IP, LLC

(57) ABSTRACT

A packet processing device, a method to be performed at the packet processing device, a computer-readable storage medium, and a computing system. The packet processing device is to determine a computing unit of the server architecture, the computing unit to execute a workload; receive a data packet including data to be used by the computing unit to execute the workload; determine, based on the computing unit to execute the workload, a memory of the server architecture to store the data for access by the computing unit to execute the workload; and route the data to the server architecture for storage at the memory.

20 Claims, 6 Drawing Sheets

(56) References Cited

U.S. PATENT DOCUMENTS

| | | |
|---|---|---|
| 2021/0117360 A1 | 4/2021 | Kutch et al. |
| 2021/0263779 A1 | 8/2021 | Haghighat et al. |
| 2021/0390405 A1 | 12/2021 | Choi et al. |
| 2022/0060405 A1 | 2/2022 | Shimizu et al. |
| 2022/0116478 A1 | 4/2022 | Biederman et al. |
| 2022/0164186 A1 | 5/2022 | Pamidala et al. |
| 2022/0166698 A1 | 5/2022 | Lee et al. |
| 2022/0327061 A1 | 10/2022 | Biederman |

OTHER PUBLICATIONS

Esmaeilzadeh, Hadi et al., "Dark Silicon and the end of Multicore Scaling," The Proceedings of the 38th International Symposium on Computer Architecture (ISCA '11) (Jun. 4-8, 2011) (12 pages).

Hardavellas, Nikos et al., "Toward Dark Silicon in Servers," IEEE Computer Society 0272-1732 (2011) (10 pages).

Hardavellas, Nikos, "The Rise and Fall of Dark Silicon," ;login, vol. 37, No. 2, Apr. 2012 (11 pages).

Hierdrich, Andrew et al., "Cache QoS: From Concept to Reality in the Intel Xeon Processor E5-2600 v3 Product Family," Intel Corporation, 978-1-4673-9211-2/16—IEEE (2016) (12 pages).

Microsoft Research, "Dark Silicon and its Implications on Server Design," Aug. 17, 2016; Youtube video available online at—https://www.youtube.com/watch?v=mlGyBgn5vKQ (37 pages).

Taylor, Michael B., "Is Dark Silicon Useful? Harnessing the Four Horsemen of the Coming Dark Silicon Apocalypse," DAC 2012, Jun. 3-7, 2012, San Francisco, CA (6 pages).

USPTO Non-Final Office Action issued in U.S. Appl. No. 17/560,900, mailed Feb. 27, 2025; 15 pages.

Singh, Inderpreet, et al. "Cache Coherence for GPU Architectures." 2013 IEEE 19th International Symposium on High Performance Computer Architecture (HPCA), 2013, pp. 578-590. IEEE Xplore, https://doi.org/10.1109/HPCA.2013.6522351.

USPTO Notice of Allowance issued in U.S. Appl. No. 17/560,900, mailed Jul. 7, 2025; 8 pages.

* cited by examiner

600

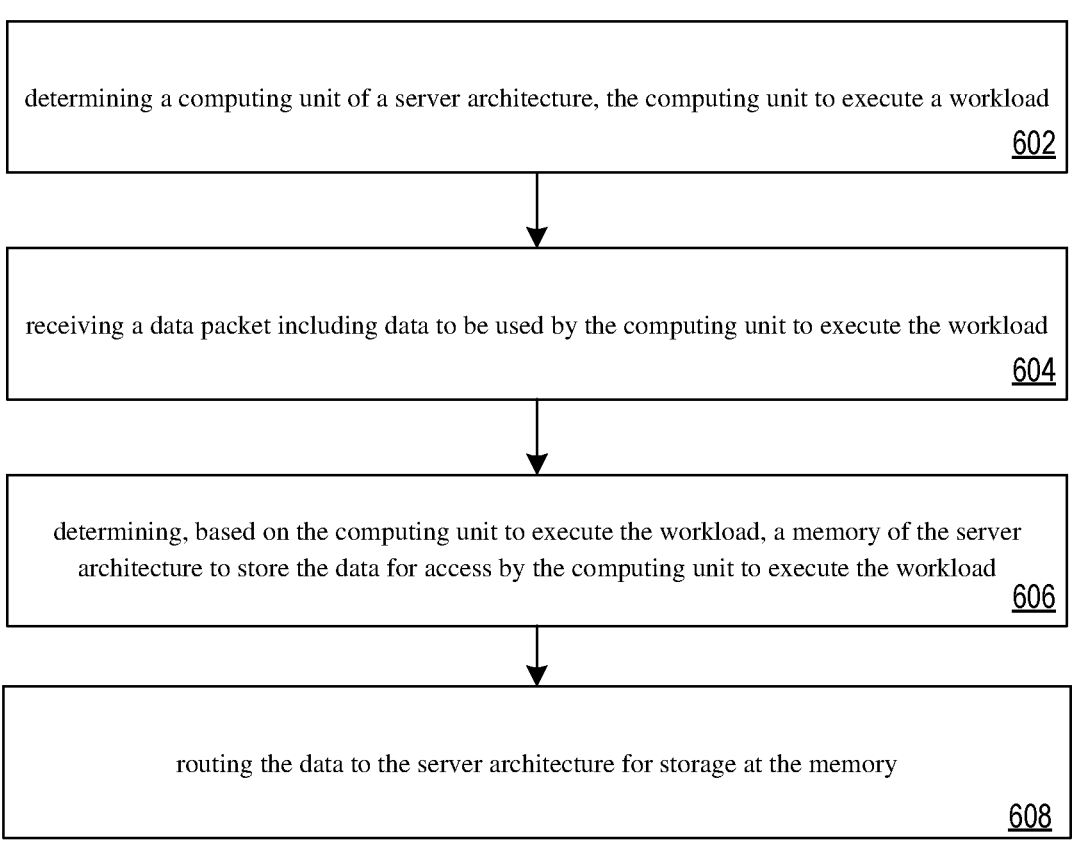

determining a computing unit of a server architecture, the computing unit to execute a workload

602 receiving a data packet including data to be used by the computing unit to execute the workload

604 determining, based on the computing unit to execute the workload, a memory of the server architecture to store the data for access by the computing unit to execute the workload

606 routing the data to the server architecture for storage at the memory

PACKET PROCESSING DEVICE TO DETERMINE MEMORY TO STORE DATA IN A SERVER ARCHITECTURE AND COMPUTING SYSTEM INCLUDING SAME

BACKGROUND

In a datacenter, data packets for use by server CPUs are typically placed in host memory, or on level 3 (L3) caches of the server. The L3 caches can overflow, and cause the data packets to be stored off chip.

BRIEF DESCRIPTION OF THE DRAWINGS

FIG. 6 depicts a process according to some embodiments.

DETAILED DESCRIPTION

Figure 1:
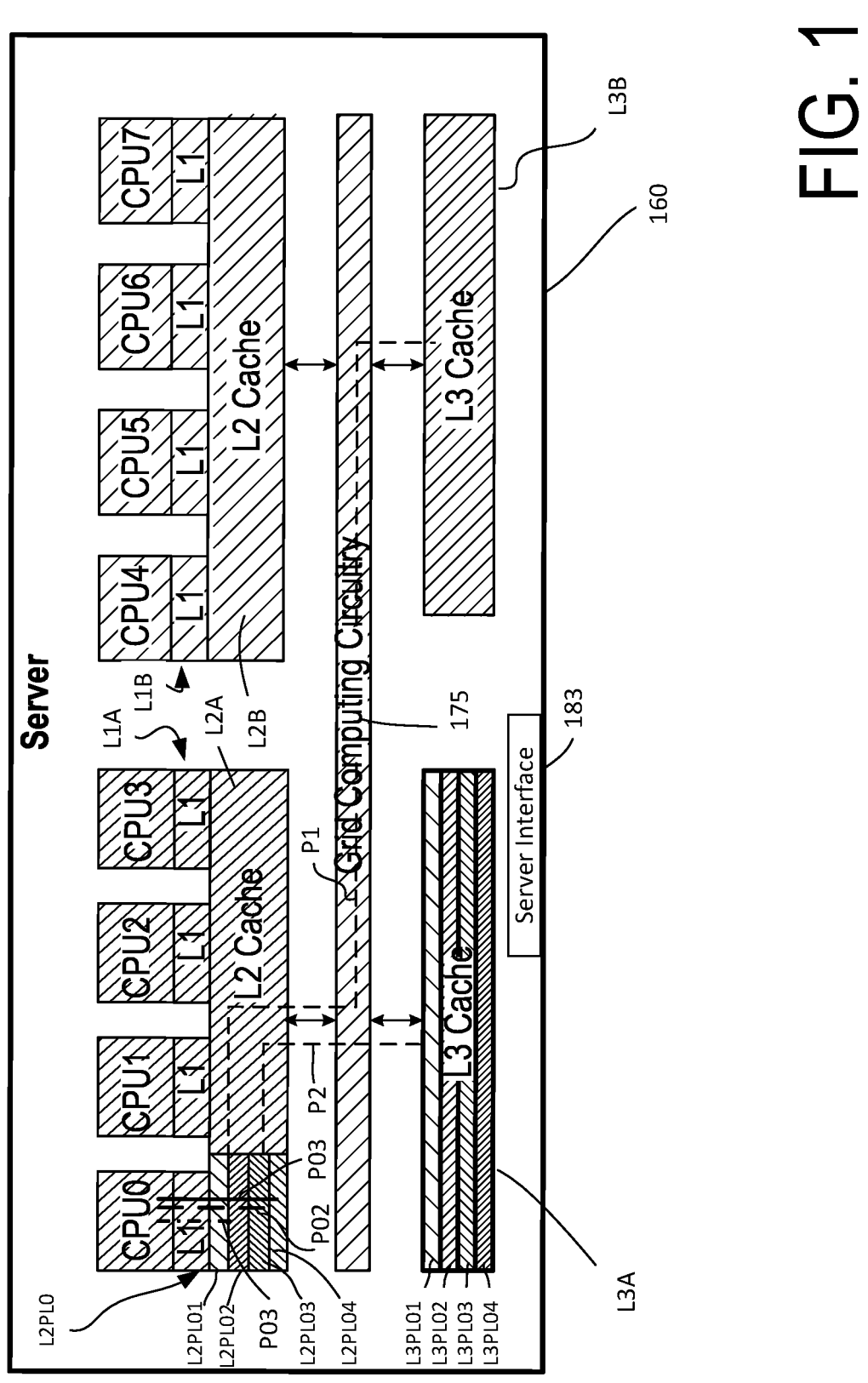
FIG. 1 depicts in schematic form an example server.

Some embodiments provide an apparatus of a packet processing device, the apparatus comprising a packet processing circuitry coupled to the interface, the packet processing circuitry to: determine a computing unit of the server architecture, the computing unit to execute a workload; receive a data packet including data to be used by the computing unit to execute the workload; determine, based on the computing unit to execute the workload, a memory of the server architecture to store the data for access by the computing unit to execute the workload; and route the data to the server architecture for storage at the memory.

Advantageously, embodiments save power at computing units of a server architecture when the computing units are accessing data from memory of the server architecture.

Some embodiments highlight a significance of the physical location of data within memory circuitries of the memory of a server architecture with respect to power consumption, for example in a data center.

In the following figures, like components will be referred to with like and/or the same reference numerals. Therefore, detailed description of such components may not be repeated from figure to figure.

In the current state of the art, data packets received by a packet processing device, such as, for example, an infrastructure processing unit (IPU), is typically routed by the packet processing device to either the host memory that is coupled to a server architecture, or to memory of the server architecture.

Embodiments recognize that if data is organized around the processors that are to use the same, the power consumption by the computing units operating on the data decreases.

For the purposes of the present disclosure, the term "processing element" refers to constructs able to process data, such as processes, threads, virtual machines, and FPGA programs.

For the purposes of this disclosure, a "computing unit" includes any physical component, or logical arrangement of physical components, capable of processing some or all of a network packet. Example computing units include, but are not limited to a CPU, a core, a CPU complex, a server complex, a field programmable gate array (FPGA), an ASIC, a graphics processing unit (GPU), or other co-processors.

For the purposes of this disclosure "a memory of a server architecture" or "memory of the server architecture" includes one or more memory circuitries of a/the server architecture or one or more physical locations of the one or more memories of the server architecture.

As used herein, "physical location aware" means adapted to determine a physical location in a memory circuitry, such as a cache, for the storage of data from a data packet, and to send the data from the data packet for storage at the determined physical location. The data may include a portion or all of the data packet, such as the header, a first number of bytes, or metadata associated with the packet.

As used herein the "physical location" within a memory circuitry refers to a physical portion of the memory circuitry that is less than an entirety of the memory circuitry physical storage space.

A "requesting computing unit" as referred to herein refers to a physical processor circuitry that is to execute a workload based on a given data packet that has been requested for execution of the workload, or to a virtual machine, container, or operating system on the physical processing circuitry that has requested the data packet for execution of the workload.

A "memory circuitry" as used herein, used in the context of a server architecture includes a memory structure which may include at least one of a cache (such as a L1, L2, L3 or other level cache including last level cache), an instruction cache, a data cache, a first in first out (FIFO) memory structure, a last in first out (LIFO) memory structure, a time sensitive/time aware memory structure, a ternary content-addressable memory (TCAM) memory structure, a register file such as a nanoPU device, a tiered memory structure, a two-level memory structure, a memory pool, or a far memory structure, to name a few. According to embodiments, a "memory circuitry" as used herein may include any of the above non-cache memory structures carved out of a cache (e.g., carved out of a L1 cache) or separate from said cache. As used herein, "a memory of a server architecture" may include one or more memory circuitries.

FIG. 1 shows an example server architecture (or server) 160 including two subsystems A and B of CPUs and their associated caches L1-L3. Subsystem A includes CPUs 0, 1, 2, and 3, their respective local L1 caches L1A, and their L2 cache L2A. Subsystem B includes CPUs 0, 1, 2, and 3, their respective local L1 caches L1B, and their L2 cache L2B. The L2 caches are shared by all CPUs of a subsystem in the shown example. The L3 caches L3A and L3B are also specific to each subsystem in the example of FIG. 1, although there could be a single L3 cache that is shared by all CPUs. L3 caches tend to be very large in terms of area, especially when they are shared among all subsystems of a server architecture.

The L3 cache, in the depicted example, are shown as being coupled to their respective L2 caches L2A and L2B by way of a grid computing circuitry 175 (e.g., a UNCORE (Uniform Interface to Computing Resources).

A server architecture may include any number of subsystems with each subsystem including any number of computing units (e.g., CPUs) and any number of associated memory circuitries (e.g., caches) in any configuration. In addition, the use of a grip computing circuitry, such as a grid computing circuitry, or other similar grid computing technology is optional.

The grid computing circuitry 175 may create target system specific actions from a XML, workload description (Abstract Workload Objects, AJO) received from a client of the computing system. Available grid computing circuitry services may include workload submission and workload management, file access, file transfer (both client-server and server-server), storage operations, and workflow submission and management.

The server architecture may include a packet processing device interface 183 using at least one of Peripheral Component Interconnect (PCI), PCI express (PCIe), PCIx, Universal Chiplet Interconnect Express (UCIe), Intel On-chip System Fabric (IOSF), Gen-Z, Open Coherent Accelerator Processor Interface (OpenCAPI), and/or Compute Express Link (CXL), Serial ATA, and/or USB compatible interface (although other interconnection standards may be used). Interface 183 is to couple the server architecture to a packet processing device to receive signals therefrom, such as data and/or instructions.

Currently, data packets received by a packet processing device are routed to and stored in any of the L3 caches, with typically only a small percentage, for example 10% or so, of the L3 being used for this purpose. The storage of data packets as noted above is currently not location aware in terms of the physical location of the cache into which the data is being stored, and further in terms of a physical distance of this physical location with respect to one or more processing elements being run on one or more computing units.

With the ever increasing speed of client workload requests by clients from a server architecture, the L3 caches tend to easily overflow with data from data packets associated with client workload requests, and such overflow is typically then stored in a host memory or external DRAM that is coupled to the server architecture. Such overflows will cause the need for off chip access to data prior to a client workload request to be executed by any of the computing units of the server architecture.

The above problem can also occur in multi-chip packages (MCPs), where a data packet associated with a workload to be executed by one or more computing units of a first chiplet may be routed and stored onto the storage of a second chiplet by virtue of storage overflow of the first chiplet, in this manner leading to larger power consumption by the MCPs.

Off chip data accesses from servers lead to much higher power consumption by computing resources than data accesses to memory circuitry in the server architecture proper. In the article "The Rise and Fall of Dark Silicon" Nikos Hardavellas (hereinafter "the Hardavellas article") highlights that to move data long distance takes power. The longer the distance the more power.

Disadvantageously, even where a server may have a number of computing units that may be able to execute processing functions concurrently, they may in fact be unable to do so where a power envelope of a computing system that includes the server is surpassed. For example, where a server includes 24 CPUs, only 16-20 may be able to function based on the server's power envelope and the data storage issues mentioned above, leaving 4-8 CPUs idle and leading to a "Dark Silicon" problem. Dark Silicon refers to the amount of circuitry of an integrated circuit that cannot be powered-on at the nominal operating voltage for a given thermal design power (TDP) constraint of the integrated circuit.

As server architectures in data centers scale and gain more and more processing cores, such as CPUs, such as 1000's of CPUs, the dark silicon problem can significantly hamper the performance of such server architectures.

Power savings are possible by placing the data close to the processor that will access it. Some embodiments consider the power consumption of data physical location and use the same to drive the operation of a packet processing device within a computing system, such as a computing system of a data center. Embodiments recognize that the use of L3 caches as described above as the location in which data packets may be stored for execution of a CPU of the associated subsystem has its drawbacks, such as those associated with L3 overflow, or such as those associated with a random placement of data onto the L3 caches, both of which among other things make the consumption of the data comparatively more power hungry.

Referring again to FIG. 1, as one can see the distance between all the memory locations to a single CPU is not equal. For example, let us assume that a data packet is received by the server 160 for execution by CPU0 of subsystem A, and stored at cache L3. As noted previously, the prior art at best stores the data at the L3 cache of the server architecture without regard to a physical location of such data on the chosen L3 cache. If the data then happens to be stored at a physical location of the L3 cache closest to subsystem B, the CPU would then need to access the data by way of path P1, which is a longer path than, say, path P2, which could have been taken if the data were stored at a physical location of cache L3 closer to subsystem A. The longer the distance between the CPU to use the data and the storage location of such data, the more power.

For instance, as noted in the Hardavellas article referred to above, reading operands from a nearby cache may take 100 pJ in a processor. However, for data access that is 10 mm away, reading the operand may take 357 pJ. We note that different manufacturing technologies however, such as 7 nm, may have different power profiles that say 10 nm or 5 nm technologies.

Even if the data packet were to be stored in the L2 caches for access by CPU0, a physical location of the data packet in the L2 cache could affect the access distance. For example, if the data packet is stored at a physical location of the L2 cache closest to CPU3, the access distance would typically be larger than that associated with a storage of the data packet at a physical location of the L2 cache that is nearest to CPU0, for example, physical location L2PL0.

By "access distance" in the context of a computing unit accessing a memory circuitry as used herein, what is meant is the power consumption required for the computing unit to access data within the memory circuitry. The access distance is based in part on a physical wiring distance between the CPU and the memory circuitry. The above is especially significant for 3-dimensional chips/chiplets or stacked dies, where, although a CPU may be a distance x away from the desired memory circuitry in which data is to be accesses, the wiring between the CPU and the memory circuitry may be a total length y, where y may be far larger than x. The access distance may further be based on pipeline stages to access the data, or to barriers (such as chiplet boundaries, number of buffers, number of interfaces, etc.) that use more power to be crossed.

Referring now to physical location L2PL0, if the data packet were to be stored nearest CPU0, for example at physical location L2PL01, it would have a shorter access distance with CPU0 than any of physical locations of L2 cache L2PL02, L2PL03 or L2PL04. The same can be said about other caches on server 160. The larger the access distance, the more power consumed by the CPU that is to access the data for execution of an associated workload.

As can be gleaned from FIG. 1, the access distances for L3 memory can be significantly longer than those for L2 subsystem level caches. The L3A cache in FIG. 1 has a shorter access distance to CPU0 than the L3B cache. Since the L3A cache is still quite large in terms of physical volume, the access distances to various physical locations of the same could be significantly different, with closer cache entries to CPU0, such as physical locations L3PL1 offering a shorter access distance to CPU0 than physical locations L3PL2, L3PL3 and L3PL4, L3PL1 thus consuming less power than L3 cache entries further away, and each of L3PLn consuming less power than L3PLn+1. Thus, even within the closest L3 cache, there could be variable power consumption based on the distance from CPU0. There could be about an 11× advantage to having the data in a close L2 location versus a very distant L3 location. Note that these access distances can be much larger in very high core count devices.

In addition, the memory location loaded by the packet processing device could be in an external memory, that is, an external cache chip or external host memory/dynamic random access memory (DRAM). The power requirement by the CPU to cross this access distance can be 16,000 pJ.

Having the packet processing device be physical location aware could save ~160× the power (16,000 pJ/100 pJ), if it can place the cache entries closest to the CPU0 (or the CPU that will process the data. Even placing the data in the closest L3 location could save 44× the power over off chip memory.

When data is successfully found in the cache, it is called a "cache hit." Cache is very fast memory. Even so, when a cache hit occurs, data in L1 cache may take a few processor cycles to access, data in L2 cache may take ten or more cycles to access, and data in L3 cache may take fifty or more cycles. If there is a cache miss, such that the CPU has to go host memory to obtain the data or instruction, the operation may take hundreds of cycles. Thus a cache miss is very computationally costly.

In order to increase communication efficiency and efficacy, a packet processing device according to embodiments may process network packets in a manner to assist the computing units of a server (e. g. CPUs) and avoid cache misses or increase cache hits while saving power. Example processes are described herein.

Figure 2:
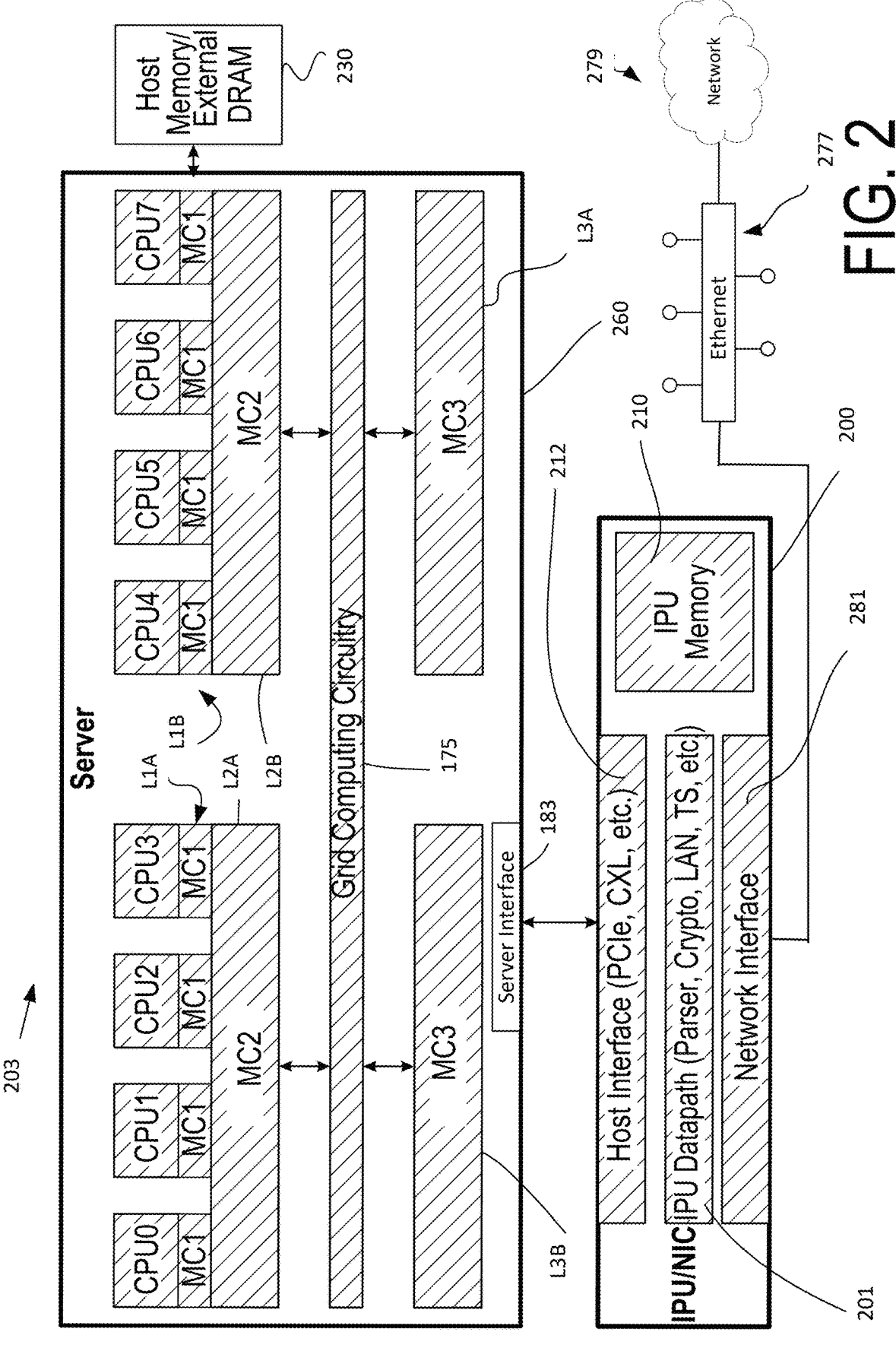
FIG. 2 depicts in schematic form an example computing system including the server of FIG. 1, coupled with a host memory and a packet processing device according to an embodiment.

FIG. 2 shows a computing system 203 according to an embodiment, the computing system for example being a computer system of a data center. The computing system 202 includes a server architecture 260 similar to that of FIG. 1 coupled to a host memory 230 and to a packet processing device 200. The packet processing device may, for example, include an IPU or a network interface card (NIC).

A difference between server architecture 260 of FIG. 2 and server architecture 160 of FIG. 1 is that server architecture 260, instead of L1, L2 or L3, caches, is shown to include, respectively, memory circuitries 1 (MC1's), MCs 2 and MCs 3.

A MC1, MC2 or MC3 as shown in FIG. 2 is to include a memory structure which may include at least one of a, respectively, L1, L2 or L3 cache, an instruction cache, a data cache, a first in first out (FIFO) memory structure, a last in first out (LIFO) memory structure, a Time sensitive/time aware memory structure, a ternary content-addressable memory (TCAM) memory structure, a register file such as a nanoPU device, to name a few. According to embodiments, a MC1, MC2 or MC3 as referred to herein may include any of the above non-cache memory structured carved out of a, respectively, L1, L2 or L3 cache, or separate from the L1, L2 or L3 cache.

Figure 3:
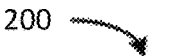
FIG. 3 depicts in schematic form an example architecture for the packet processing device of FIG. 2.
Figure 3:
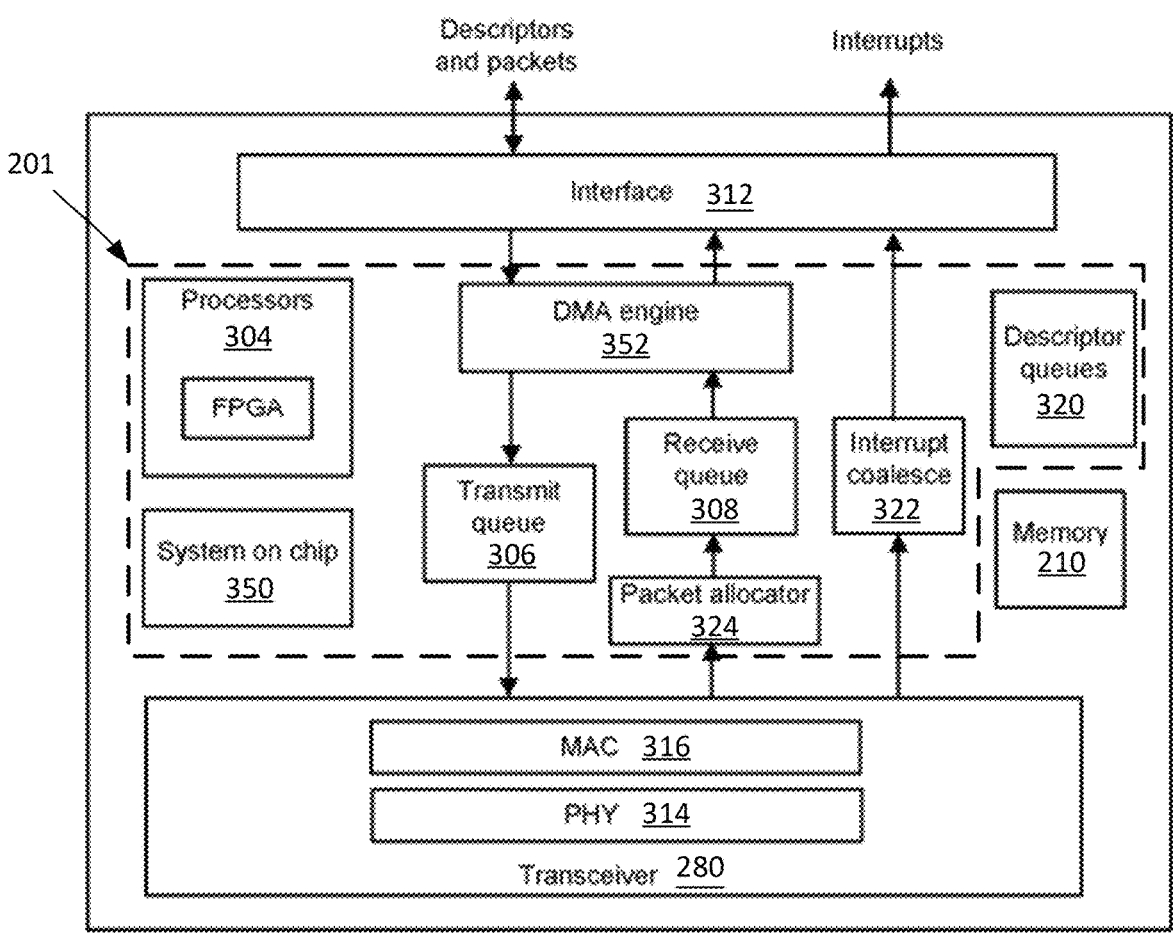

The shown packet processing device 200, an example of which is described in further detail in relation to FIG. 3, may include an IPU by way of example. Packet processing device 200 has a network interface 281 which is connected to Ethernet 277. The Ethernet 277 may connect the computing system 203 to a network 279 including client devices (not shown). At the other end of the IPU, a host interface 212 may connect the IPU with the server architecture 260 160 using Peripheral Component Interconnect (PCI) or Compute Express Link (CXL), for example through a corresponding PCI or CXL interface 183. Between the network interface 281 and the host interface 212, packet processing circuitry 201 processes and routes the data packets received by the packet processing device 200 by way of Ethernet 277 from the network 279. The packet processing circuitry 201 may implement, for example, a Flexible Parser (FXP), or one or more of many different other protocols (e.g., RDMA, NVMe, Encryption, etc.) as well as packet storage and decryption. In the ingress direction, packet processing circuitry 201 may be configured to place the data at various locations in the host memory 230.

According to embodiments, the packet processing device 200 is physical location aware. The packet processing device may be physical location aware by, for example, determining the physical location based on a physical location of one or more computing units (such as CPUs) that are to execute a workload based on the data packet (e.g., one or more "requesting computing units"). The physical location of a memory circuitry refers to a physical portion of the circuitry where the data from the data packet is to be stored. A "requesting computing unit" as referred to herein refers to a physical processor circuitry that is to execute a workload based on a given data packet that has been requested for execution of the workload, or to a virtual machine, container, or operating system on the physical processing circuitry that has requested the data packet for execution of the workload.

As seen in FIG. 2, the packet processing device 200 includes built-in computing units 201 and processing elements and a close-cooperation interface 212 with the server architecture 160 260, is, according to some embodiments, adapted to use knowledge about various conditions in the computing system (e.g., both the state of the packet processing device 200 itself and/or the operational state of the server architecture 200 260) to manage data routing operations on data packets being received from Ethernet 277. Such data routing operations include routing data from data packets received from the network to various physical locations of caches within server 160 in order to make the performance of the server more efficient and more reliable. For example, a state of the server architecture may include at least one of: an amount of storage space available in a cache, a consumption rate of data from a cache, a consumption rate of an application, a consumption rate of a type of data from a cache, a consumption rate based on processing unit type (e.g., Xeon vs. Atom vs. a very small core), a processing speed of one or more of the computing units of the server, a slot of time within which data is expected to be processed at the server architecture, remaining processing time for workloads being, and in the queue to be, processed by one or more of the computing units, to name a few.

In general, and as suggested previously, the packet processing device 200 receives a data packet or packets over a L1 or L2 interface, and uses a parser within packet processing circuitry 201, to determine one or more physical locations for the data within the server architecture 160 caches. A determination of the one or more physical locations for the data by the packet processing device may be characterized, in some embodiments, as "stateful," meaning it may rely on current or historical saved state metadata relating to the data to be stored in the server's caches, the computing units (such as CPUs) of the server architecture, the workload that is to be executed by one or more of the computing units, to name a few examples.

The packet processing circuitry 201 may perform processing, including the determination of physical locations of caches in a server as described herein, using on-packet processing device computing units, such as application specific integrated circuits (ASICs), FPGAs, or the like, and processing elements, such as FPGA programs, virtual machines (VMs), or the like. The packet processing circuitry may perform operations on a packet, such as encapsulate/decapsulate, encrypt/decrypt, add/remove headers, aggregate/split, add timestamps, etc., perform operations relating to a state of the packet, such as save/update metadata, change internal or system configurations to handle packet processing, query/use stored metadata, query/use current or historical state of packet processing device or system, request/schedule packet processing device, and system-level state changes (e.g., pre-load caches, load FPGA code in either on-packet processing device FPGA or server architecture FPGA, or both, etc.).

When a data packet arrives at the packet processing device 200, it may decrypt the same if encrypted, parse/decode the same to associate the same with a flow of packets to be routed to the server architecture 260, determine metadata associated with the packet (such as, for example, metadata relating to the service or microservice being requested by the sender of the data packet or metadata relating to one or more of flow data, virtual machine/container data, priority information or Quality of Service information), and then send the data from the packet to one or more computing units of the server to allow execution of a workload using the data.

According to an embodiment, a packet processing circuitry, such as packet processing circuitry 201, may be adapted to determine a physical location on a server of a processing circuitry to execute a workload, receive a data packet including data to be accessed by the processing circuitry to execute the workload, and send the data for storage at one or more physical locations on the server of memory circuitry (such as a cache) based on the physical location of the processing circuitry.

The one or more physical locations selected by the packet processing circuitry 201 may be determined based on a consumption rate of data at one or more of the caches of the server architecture 260. According to such an embodiment, the packet processing circuitry 201 may have knowledge regarding a consumption rate of data at the caches MC1, MC2 and/or MC3, and may determine a physical location for the data to be used for execution of a workload by a computing unit of the server architecture based on the knowledge. For example, the packet processing circuitry 201 may have knowledge regarding the consumption rate based on having historical knowledge regarding the workloads being executed by the computing units, where data related to those workloads was stored in the caches, and the expected consumption time of the data for each of those caches. In addition, the packet processing circuitry 201 may have knowledge regarding the consumption rate of data based on feedback from the server to the packet processing circuitry 201.

The one or more physical locations selected by the packet processing circuitry 201 may be determined based on load balancing concerning a state of the computing units of the server architecture. For example, according to an embodiment, the packet processing circuitry 201 may have knowledge regarding current computing capacities of respective ones of the computing units of the server architecture 260 and may determine one or more computing units to execute a workload on the data based on the computing capacities. In a related manner, the packet processing circuitry 201 may then determine a physical location for the data to be used for execution of a workload based on the selected computing unit(s) that are to execute the workload. For example, the packet processing circuitry 201 may have knowledge regarding the current computing capacities based on having historical knowledge regarding the workloads being executed by the computing units. In addition, the packet processing circuitry 201 may have knowledge regarding the current computing capacities based on feedback from the server to the packet processing circuitry 201.

A packet buffer in packet processing device 200 may be used to act as a storage space set aside for storing packets received from the network.

As packets are received by the packet processing circuitry, they may be parsed and stored in the packet buffer. The packet processing circuitry 201 may inspect the contents of the incoming packet using packet inspection mechanisms, for example, using a TCP Offload Engine (TOE) and corresponding features. Looking up the layers in the packet's encapsulation, the packet processing circuitry 201 may be able to determine the Source/Destination, Traffic-handling and meta-data markings, application, or even the data contents. The packet inspection does not have to be deep packet inspection. It could be as simple as looking at the source address/port number/other header information and knowing that all traffic from this source address/port number/header information needs to be processed using a particular program or processing element, and may correspond to a given workload/process/instruction to be executed.

Information obtained during the process of packet analysis may be stored in a metadata database, for example in the packet processing device's memory 210. The metadata database may store various metadata about a packet or group of packets. For example, the metadata database may include a service associated with the workload corresponding to the data packet, number of received packets of certain type, a program needed to process the packet or similar packets, a virtual machine needed to process the packet or similar packets, an FPGA program to process the packet or similar packets, a statistical profile of the packet or similar packets, and the like. The metadata database may be used by the packet processing circuitry 201 to manage coordination, scheduling, loading, and unloading of processing elements. The metadata database may further be used by the packet processing circuitry 201 in order to manage data routing operations to route data to a selected/determined physical location of a cache in the server architecture 260.

The packet processing circuitry 201 may implement coordinated scheduling with the processing element associated with one or more computing unit(s) implement the processing element. The coordinated scheduling is in order to determine proper scheduling decisions.

According to one embodiment, the concept of process coordinated scheduling by the packet processing device 200 may be based on the concept of just-in-time (JIT) processing. JIT processing is similar to JIT manufacturing. JIT manufacturing is where the parts to assemble a device, such as a car, are delivered shortly before the assembly of the device. This allows the manufacturer to maintain a smaller inventory and still quickly produce the product.

In the present context, if a packet processing circuitry, such as packet processing circuitry 201, is coordinated in terms of a scheduling of its operations with the processing element to be executed on one or more computing units (e.g., CPUs), and understands what may be processed and when, the packet processing circuitry 201 may be able to deliver data that needs to be processed just before it is needed, and to the best available physical location on a cache of the associated server. This may result in much lower power requirements by the server, fewer cache/FPGA/VM misses and also allows for smaller hardware (e.g., cache) requirements in design. The smaller power requirements may be for computing units of a server connected to the packet processing device 200 by virtue of the same being adapted to determine a physical location for the storage of data from a received data packet.

A tightly compact set of instructions may be used in JIT processing. Prior to the time the processing element executes that set of instructions, the packet processing circuitry 201 may load (route and cause storage of) the incoming packet data into to the cache(s). This allows the instructions and data to arrive just in time to be processed.

According to some embodiments, the one or more physical locations selected by the packet processing circuitry may be based on precision timing of the arrival and/or departure/eviction of data to/from a cache memory physically located near the computing unit that is to use the same.

For the packet processing circuitry 201 to implement coordinated scheduling with the processing element(s), the coordinated scheduling may need to be very accurate and precise. This precision and accuracy may be accomplished by sharing the same clock circuitry as between the packet processing circuitry 201 and the computing units of the server. However, in some cases this is not possible. Hence, other coordinated scheduling mechanisms, such as the Institute of Electrical and Electronic Engineers (IEEE) 1588 Precision Time Protocol (PTP), the IEEE 802.1 Time-Sensitive Networking (TSN), Synchronous Ethernet. Network Time Protocol (NTP), or wireless network time coordinated scheduling mechanisms (e.g., Reference Broadcast Synchronization (RBS), Timing-sync Protocol for Sensor Networks (TPSN), Flooding Time Synchronization Protocol (FTSP), etc.) may be used. Likewise Precision Time Measurement (PTM) may be used over PCIe interfaces.

The packet processing circuitry 201 may be able to use an appropriate timing constraints to implement coordinated scheduling with various processing elements of a computing unit, such as a processor core, FPGA, VM, or other components such as GPUs, accelerator circuits, general purpose GPUs (GPGPUs), etc. In the case of an FPGA, for example, lead time may be different in that the FPGA may take a significant amount of time to reprogram itself or a partition. To accommodate this extended reprogramming time, the packet processing circuitry 201 is operable to send in the program first, and when the partition is just about to finish programming, send the data so that it may be processed nearly immediately after being loaded into the FPGA. A packet processing device according to some embodiments may use of precise time in precisely loading data, such that it can be consumed and not spill over into a more distant memory.

A physical location aware packet processing device may, according to an embodiment, be adapted to split a data packet based on having determined more than one physical location for the storage of data within the data packet. Thus, the packet processing device according to an embodiment may determine that a data packet it has received is to be split into multiple data portions, with each data portion to be caused to be stored at different corresponding physical locations of memory on the server.

By parsing and inspecting the packet (or microservice) it could identify and place the data (or the important data) close to the computing unit that will be accessing that data. Similarly, the less important or less used data could be placed in MC3 or the external host memory/DRAM.

According to embodiments, the packet processing circuitry not only determines a cache into which data from a data packet may be stored for use by a computing unit of a server architecture, but also determines a physical location within the cache for storage of the data. Knowledge of the physical location of the computing units, and the location/distance associated with the memory circuitries (e.g., caches) and the computing units, can be used to choose an optimum location for the incoming data to be placed.

A physical location aware packet processing device may, according to an embodiment, be adapted to route data from a received data packet to a physical location of a cache based on a weight (or incentive) or penalty (or disincentive) for placing the data at the given physical location. For example, where certain types of workloads, such as microservices, are to be run on a given set of computing units, say CPUs 0 and 1 in server 260 160 of FIG. 2, then, the packet processing device 200 when it receives a data packet not associated with a microservice, may prioritize routing the data, to physical locations on caches nearest CPUs other than CPUs 0 and 1. Conversely, when packet processing device 200 receives a data packet associated with a microservice, it may prioritize routing the data to physical locations on caches nearest CPUs 0 and 1.

A physical location aware packet processing device may, according to an embodiment, be adapted to route data from a received data packet to a physical location of a cache based on a rate of consumption of data from the physical location. For example, the packet processing device may determine the consumption rate of data at one or more physical locations of the caches within an associated server, and may determine to place the data at a cache closest to a computing unit that is to execute a workload using the data that is, in addition, a cache with a highest rate of data consumption.

A physical location aware packet processing device may, according to an embodiment, be adapted to route data from a received data packet to a physical location of a cache based on whether the data corresponds to a highly used data structure (i.e. linked lists, first in first out (FIFO) devices, circular buffers, etc.) or the head/tail of such structures, close to the CPUs that will consume them, then instructing the IPU to place data at those locations (possibly at certain times). For example, the packet processing device may place highly used data structures into a first register, where all of the data may be accessible in a single clock cycle for ready access. However, for FIFO data structure, the packet processing device may place the data into the FIFO device, which may overflow into power friendly memory circuitries of the server, such as a suitable physical location of any of the caches.

A physical location aware packet processing device may, according to an embodiment, be adapted to route instructions associated with a data packet to one or more computing units based on a determination by the packet processing device of a cache physical location for storing data from the data packet. In this manner, once the physical location(s)

is/are determined for the data, the packet processing device may route related instructions/workloads to the computing units that are nearest to those physical locations.

Embodiments include within their scope a packet processing device that is to determine the cache physical location for data from a received data packet either based on its own processing to generate information on such physical location or based on information indicating such physical location to the packet processing device, for example through metadata in the data packet itself. The information indicating the physical location(s) may be determined for example by the network and sent to the packet processing device separately from, together with or as part of the data packet.

Embodiments include within their scope a packet processing device that is to, in turn, send information indicating the physical location(s) to another chip, such as a server chip, GPU, AI chip, or XPU. Thus, the packet processing device "routing" the data for storage at a given physical location of memory close to a computing unit includes within its scope the packet processing device causing another device to directly route the data to the given physical location.

A physical location aware packet processing device may, according to an embodiment, be adapted to target/route microservices to certain computing units of the server architecture and route the corresponding data to the physical locations of the server based on such targeting.

If one computing unit is overloaded with a microservice workload, the packet processing device may be adapted to move the microservice workload fully or partially to another computing unit, and the move the data to a new physical location based on the same.

A physical location aware packet processing device may, according to an embodiment, be adapted to route virtual machine instructions to one or more computing units of a server architecture, for example using load balancing or a mapping table mapping virtual machine instructions to corresponding computing units, and to route the data from the received data packet to the physical locations near the virtual machines thus routed. If the virtual machine needs to be moved to a new computing unit, the packet processing device may reroute the corresponding data to a new physical location near the new computing unit.

For load balancing, the packet processing device may be aware of an amount (e.g., in bytes) of instructions sent to the computing units, and may thus base a determination regarding the physical location based on this amount. For example, if a workload is to run on a computing unit based on a run to completion regime, the packet processing device may know, based on the amount of instructions, how much longer it may take for the computing unit to execute the instructions, and may base its determination of a physical location for subsequent data on such knowledge. Alternatively the packet processing device may use a timetable for the execution of workloads, and base its determination of the physical location of data based on the timetable.

According to some embodiments, the determination of physical location may be made by a packet processing circuitry based on a processor load balancing and/or on cache availability of a server architecture. The determination may be made based on information, such as metadata, contained in the data packet to cause the packet processing device to route the data packet for storage to the physical location.

Advantageously, some embodiments may provide for a power savings of about 160× as compared with solutions of the prior art which may direct the packet data to a nearby cache of a computing unit. Some embodiments achieve the above by precisely placing data into a cache physically located near the computing unit that will use it to execute an associated workload.

For example, where data to be used by a computing unit (including a virtual machine running on a computing unit) is stored in a nearby cache, there can be significant value, for example a power saving that is about 11×, to such placement as compared with placement of the same data on chip, but across the chip from the computing unit. Such power savings can be about 3.09× for data access from a 10 mm away cache versus an across die cache.

FIG. 3 depicts an example packet processing device according to some embodiments, such as an packet processing device 200 of FIG. 2. In some examples, configuration of the packet processing device regarding a physical location for the storage of packet data can be programmed using a given processor of processors 304 and sending the packet data for storage at a selected physical storage location, such as a selected physical location of a cache, can continue during updates to software executing on the given processor, or during other unavailability of the given processor, as a second processor of processors 304 may provide connectivity to a host such as one or more servers and the second processor can configure operation of programmable pipelines, as described herein. In some examples, packet processing device 200 can be implemented as a network interface controller (NIC), network interface card, a host fabric interface (HFI), or host bus adapter (HBA), and such examples can be interchangeable. Packet processing device 200 can be coupled to one or more servers using a bus, PCIe, CXL, or DDR. Packet processing device 200 may be embodied as part of a system-on-a-chip (SoC) that includes one or more processors, or included on a multichip package that also contains one or more processors.

Some examples of packet processing device 200, similar to that of FIG. 2, may be part an IPU or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Packet processing device 200 can include transceiver 280, processors 304, transmit queue 306, receive queue 308, memory 210, and bus interface 312, and DMA engine circuitry 352. The processors 304, system on chip 350, DMA engine 352, transmit queue 306, receive queue 308, interrupt coalesce 322, packet allocator circuitry 324 and descriptor queues 320 may be part of a packet processing circuitry 201, similar to example to packet processing circuitry 201 of FIG. 2.

Transceiver 280 can be capable of receiving and transmitting packets in conformance with the applicable protocols such as Ethernet as described in IEEE 802.3, although other protocols may be used. Transceiver 280 can receive and transmit packets from and to a network via a network medium (not depicted). Transceiver 280 can include PHY circuitry 314 and media access control (MAC) circuitry 316. PHY circuitry 314 can include encoding and decoding circuitry (not shown) to encode and decode data packets according to applicable physical layer specifications or standards. MAC circuitry 316 can be configured to assemble data to be transmitted into packets, which include destination and source addresses along with network control information and error detection hash values.

Processors 304 can be any a combination of a: processor, core, graphics processing unit (GPU), field programmable gate array (FPGA), application specific integrated circuit (ASIC), or other programmable hardware device that allow programming of network interface of packet processing device 200. For example, a "smart network interface" can provide packet processing capabilities in the network interface using processors 304.

Processors 304 can include one or more packet processing pipeline that can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines can perform one or more of: packet parsing (parser), exact match-action (e.g., small exact match (SEM) engine or a large exact match (LEM)), wildcard match-action (WCM), longest prefix match block (LPM), a hash block (e.g., receive side scaling (RSS)), a packet modifier (modifier), or traffic manager (e.g., transmit rate metering or shaping). For example, packet processing pipelines can implement access control list (ACL), or packet drops due to queue overflow.

Configuration of operation of processors 304, including its data plane, can be programmed using Programming Protocol-independent Packet Processors (P4), C, Python, Broadcom Network Programming Language (NPL), Infrastructure Programmer Development Kit (IPDK), or x86 compatible executable binaries or other executable binaries. Processors 304 and/or system on chip 350 can execute instructions to configure and utilize one or more circuitry as well as check against violation against use configurations, as described herein.

Packet allocator circuitry 324 can provide distribution of received packets for processing by multiple computing units, such as CPUs 0 to 7 of FIG. 2, or cores, and can do so using packet data allocation to various cache physical locations on the server, such as server architecture 260 of FIG. 2. When packet allocator circuitry 324 uses RSS, packet allocator circuitry 324 can calculate a hash or make another determination based on contents of a received packet to determine which CPU or core is to process a packet. The latter provides one example of implementation regarding allocation of a packet to a CPU, but also, additionally and in a related manner, to an embodiment where the packet allocator circuitry 324 is adapted to manage data routing operations by selecting cache physical locations for the storage of packet data according to an embodiment. Packet allocator circuitry 324 could, in one embodiment, be included within processors 304, or it could be separate from it.

Interrupt coalesce circuitry 322 can perform interrupt moderation whereby network interface interrupt coalesce circuitry 322 waits for multiple packets to arrive, or for a time-out to expire, before generating an interrupt to host system to process received packet(s). Receive Segment Coalescing (RSC) can be performed by network interface of packet processing device 200 whereby portions of incoming packets are combined into segments of a packet. Network interface 202 provides this coalesced packet to an application.

Direct memory access (DMA) engine circuitry 352 is configured to copy a packet header, packet payload, and/or descriptor directly from host memory to the network interface or vice versa, instead of copying the packet to an intermediate buffer at the host and then using another copy operation from the intermediate buffer to the destination buffer.

Memory 210 can be any type of volatile or non-volatile memory device and can store any queue or instructions used to program network interface of packet processing device 200. Transmit queue 306 can include data or references to data for transmission by network interface of packet processing device 200. Receive queue 308 can include data or references to data that was received by network interface of packet processing device 200 from a network. Descriptor queues 320 can include descriptors that reference data or packets in transmit queue 306 or receive queue 308. Bus interface 312 can provide an interface with a server For example, bus interface 312 can be compatible with at least one of Peripheral Component Interconnect (PCI), PCI express (PCIe), PCIx, Universal Chiplet Interconnect Express (UCIe), Intel On-chip System Fabric (IOSF), Gen-Z, Open Coherent Accelerator Processor Interface (Open-CAPI), and/or Compute Express Link (CXL), Serial ATA, and/or USB compatible interface (although other interconnection standards may be used).

Figure 4:
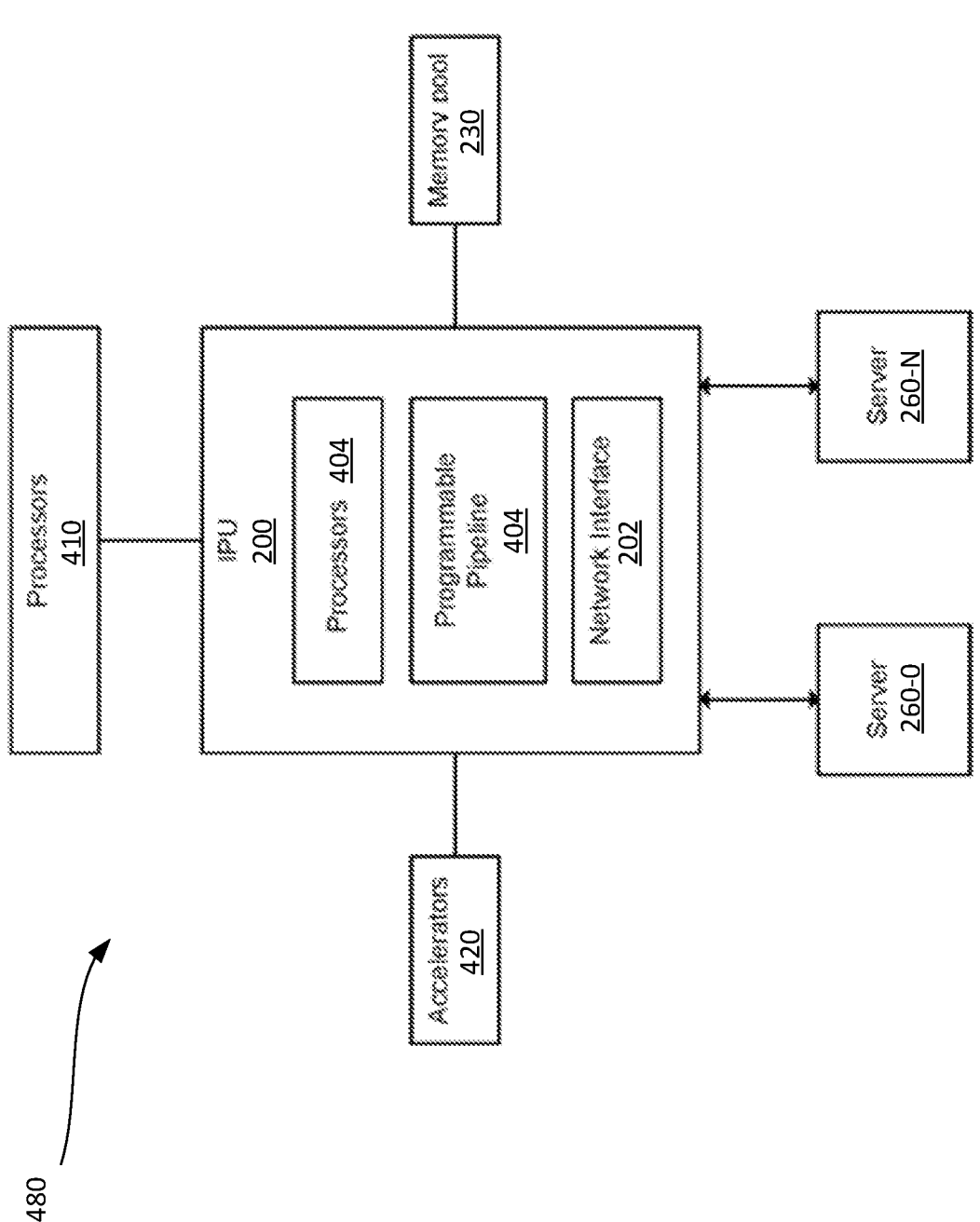
FIG. 4 depicts in schematic form another example computing system including a packet processing device according to an embodiment.

FIG. 4 depicts an example system 480 that may be used to implement some embodiments. In this system, IPU 200 manages performance of one or more processes using one or more of processors 204, processors 410, accelerators 420, memory pool 230, or servers 440-0 to 440-N, where N is an integer of 1 or more. In some examples, processors 204 of IPU 200 can execute one or more processes, applications, VMs, containers, microservices, and so forth that request performance of workloads by one or more of: processors 410, accelerators 420, memory pool 230, and/or servers 440-0 to 440-N. IPU 200 can utilize network interface 202 or one or more device interfaces to communicate with processors 410, accelerators 420, memory pool 230, and/or servers 440-0 to 440-N. IPU 200 can utilize programmable pipeline 404 to process packets that are to be transmitted from network interface 202 or packets received from network interface 202.

In some examples, configuration of programmable pipelines 404 can be programmed using a processor of processors 204 and operation of programmable pipelines 404 can continue during updates to software executing on the processor, or other unavailability of the processor, as a second processor of processors 204 provides connectivity to a host such as one or more of servers 260-0 to 260-N and the second processor can configure operation of programmable pipelines 404.

Figure 5:
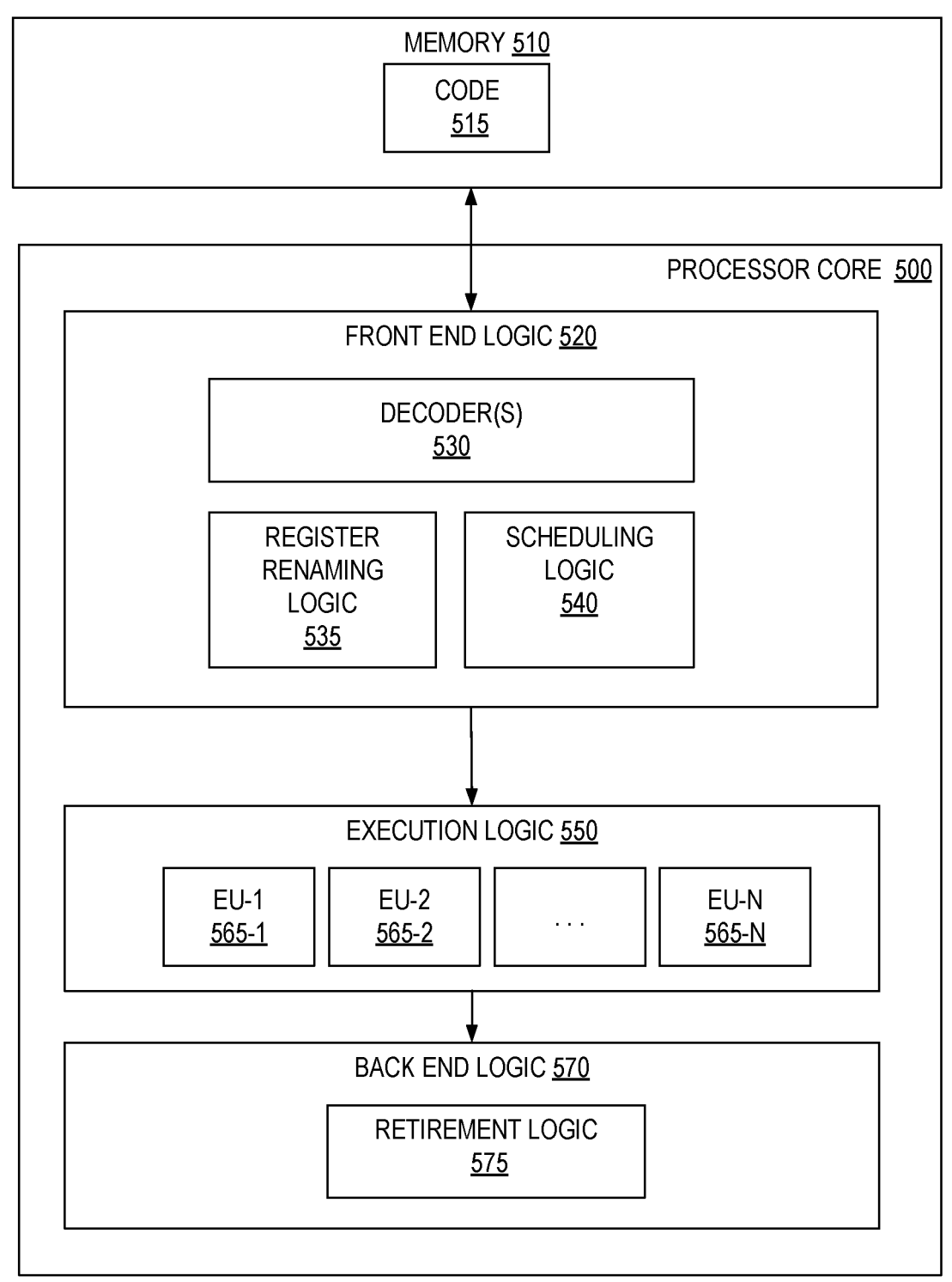
FIG. 5 depicts in schematic form an example computing core system.

FIG. 5 is a block diagram of an exemplary processor core 204 to execute computer-executable instructions as part of implementing technologies described herein. The processor core 204 can be a core for any type of processor, such as a microprocessor, an embedded processor, a digital signal processor (DSP) or a network processor. The processor core 204 can be a single-threaded core or a multithreaded core in that it may include more than one hardware thread context (or "logical processor") per core.

FIG. 5 also illustrates a memory 210 coupled to the processor 500. The memory 210 can be any memory described herein or any other memory known to those of skill in the art. The memory 210 can store computer-executable instruction 515 (code) executable by the processor core 204.

The processor core comprises front-end logic 520 that receives instructions from the memory 210. An instruction can be processed by one or more decoders 530. The decoder 530 can generate as its output a micro operation such as a fixed width micro operation in a predefined format, or generate other instructions, microinstructions, or control signals, which reflect the original code instruction. The front-end logic 520 further comprises register renaming logic 535 and scheduling logic 540, which generally allocate resources and queues operations corresponding to converting an instruction for execution.

The processor core 204 further comprises execution logic 550, which comprises one or more execution units (EUs) 565-1 through 565-N. Some processor core embodiments can include a number of execution units dedicated to specific functions or sets of functions. Other embodiments can include only one execution unit or one execution unit that can perform a particular function. The execution logic 550 performs the operations specified by code instructions. After completion of execution of the operations specified by the code instructions, back-end logic 570 retires instructions using retirement logic 575. In some embodiments, the processor core 204 allows out of order execution but requires in-order retirement of instructions. Retirement logic 570 can take a variety of forms as known to those of skill in the art (e.g., re-order buffers or the like).

The processor core 204 is transformed during execution of instructions, at least in terms of the output generated by the decoder 530, hardware registers and tables utilized by the register renaming logic 535, and any registers (not shown) modified by the execution logic 550. Although not illustrated in FIG. 6, a processor can include other elements on an integrated chip with the processor core 204. For example, a processor may include additional elements such as memory control logic, one or more graphics engines, I/O control logic and/or one or more caches.

FIG. 6 depicts a process 600 according to some embodiments. The process 600 at operation 602 includes determining a computing unit of a server architecture, the computing unit to execute a workload. The process 600 at operation 604 includes receiving a data packet including data to be used by the computing unit to execute the workload. The process 600 at operation 606 includes determining, based on the computing unit to execute the workload, a memory of the server architecture to store the data for access by the computing unit to execute the workload. The process 600 at operation 608 includes routing the data to the server architecture for storage at the memory.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/ or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores," may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for another. For example, descriptions using the terms "connected" and/or "coupled" may indicate that two or more elements are in direct physical or electrical contact with another. The term "coupled," however, may also mean that two or more elements are not in direct contact with another, but yet still co-operate or interact with another.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. A component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

EXAMPLES

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 includes an apparatus of a packet processing device comprising, the apparatus comprising: an interface to connect to a server architecture having a plurality of computing units and a plurality of memory circuitries coupled to the computing units; and a packet processing circuitry coupled to the interface, the packet processing circuitry to: determine a computing unit of the server architecture, the computing unit to execute a workload; receive a data packet including data to be used by the computing unit to execute the workload; determine, based on the computing unit to execute the workload, a memory of the server architecture to store the data for access by the computing unit to execute the workload; and route the data to the server architecture for storage at the memory.

Example 2 includes the subject matter of Example 1, wherein the packet processing circuitry is to determine the memory of the server architecture by determining one or more physical locations of the memory.

Example 3 includes the subject matter of Example 2, wherein the packet processing circuitry is to determine the one or more physical locations based on an access distance between the one or more physical locations and the computing unit to execute the workload.

Example 4 includes the subject matter of Example 1, wherein the packet processing circuitry is to determine the memory by determining an association between at least one of the workload or the data with at least one of the computing unit or the memory.

Example 5 includes the subject matter of Example 2, wherein the packet processing circuitry is to determine the one or more physical locations of the memory to be one or more available physical locations of the memory physically closest to the computing unit to execute the workload.

Example 6 includes the subject matter of Example 2, wherein the packet processing circuitry is to determine the one or more physical locations of the memory based on a state of the server architecture including at least one of: an amount of storage space available at one or more memory circuitries of the memory, a consumption rate of data from the one or more memory circuitries, an amount of storage space available at one or more of the memory circuitries, a consumption rate of data from one or more of the memory circuitries, a processing speed of one or more of the computing units, remaining processing times for workloads being or in a queue to be processed by one or more of the computing units.

Example 7 includes the subject matter of Example 6, wherein the packet processing circuitry is to determine the one or more physical locations of the memory based on historical information on a state of the server architecture.

Example 8 includes the subject matter of Example 6, wherein the packet processing circuitry is to determine the one or more physical locations of the memory based on information sent to it regarding a current state of the server architecture.

Example 9 includes the subject matter of Example 1, wherein the packet processing circuitry is to determine the memory based on load balancing for workloads as between the computing units.

Example 10 includes the subject matter of Example 1, wherein the packet processing circuitry is to determine the memory based on a coordinated scheduling of data routing operations of the packet processing circuitry with workload processing operations of one or more of the computing units.

Example 11 includes the subject matter of Example 10, wherein the packet processing circuitry is to route the data to the server architecture based on the coordinated scheduling by routing the data to the memory as the data is about to be consumed by the computing unit for execution of the workload.

Example 12 includes the subject matter of Example 11, wherein the packet processing circuitry is to base a routing of the data to the server architecture on the coordinated scheduling by using a Precision Time Measurement (PTM) protocol.

Example 13 includes the subject matter of Example 2, wherein the workload is a first workload corresponding to a first portion of a program, the computing unit to execute the first workload is a first computing unit to execute the first workload, the data of the data packet is first data of the data packet, the one or more physical locations of the memory include a first physical location of the memory to store the first data, the packet processing circuitry to: determine a second computing unit of the server architecture to execute a second workload, the second workload corresponding to a second portion of the program; determine, based on the second computing unit, a second physical location of the one or more physical locations, the second physical location to store second data of the data packet for access by the second computing unit to execute the second workload; and route the second data to the server architecture for storage at the second physical location.

Example 14 includes the subject matter of Example 13, wherein the packet processing circuitry is to determine the first data and the second data based on respective types thereof.

Example 15 includes the subject matter of Example 1, wherein the packet processing circuitry is to determine the memory based on whether the data corresponds to a highly used data structure.

Example 16 includes the subject matter of Example 2, wherein the data packet is a first data packet, the computing unit is a first computing unit, the workload is a first workload, and the one or more physical locations are one or more first physical locations, the packet processing circuitry to: receive a second data packet; determine one or more second physical locations of the memory to store data of the second data packet; route the data of the second data packet to the server architecture for storage at the one or more second physical locations; determine, based on the one or more second physical locations, a second computing unit of the server architecture to execute a second workload on the data of the second data packet; and route instructions, based on the second workload, to the second computing unit.

Example 17 includes the subject matter of Example 2, wherein the packet processing circuitry is to receive a signal including information indicating the one or more physical locations, and to decode the signal to determine the one or more physical locations therefrom.

Example 18 includes the subject matter of Example 17, wherein the signal is part of the data packet.

Example 19 includes the subject matter of Example 1, wherein the packet processing circuitry is to route microservices to designated computing units of the server architecture, and to route data from data packets corresponding to the microservices to the memory based on the designated computing units.

Example 20 includes the subject matter of Example 1, wherein the packet processing circuitry is to move the data from one physical location to another physical location of the memory based on the workload moving from the computing unit to another computing unit of the server architecture.

Example 21 includes the subject matter of Example 1, wherein the packet processing device comprises one or more of: a network interface controller (NIC), a remote direct memory access (RDMA)-enabled NIC, SmartNIC, router, switch, forwarding element, infrastructure processing unit (IPU), or data processing unit (DPU).

Example 22 includes a non-transitory computer-readable storage medium comprising instructions stored thereon, that when executed by one or more processors of a packet processing device, cause the one or more processors to: determine a computing unit of a server architecture, the computing unit to execute a workload; receive a data packet including data to be used by the computing unit to execute the workload; determine, based on the computing unit to execute the workload, a memory of the server architecture to store the data for access by the computing unit to execute the workload; and route the data to the server architecture for storage at the memory.

Example 23 includes the subject matter of Example 22, the instructions to cause the one or more processors to determine the memory of the server architecture by determining one or more physical locations of the memory.

Example 24 includes the subject matter of Example 23, the instructions to cause the one or more processors to determine the one or more physical locations based on an access distance between the one or more physical locations and the computing unit to execute the workload.

Example 25 includes the subject matter of Example 22, the instructions to cause the one or more processors to determine the memory by determining an association between at least one of the workload or the data with at least one of the computing unit or the memory.

Example 26 includes the subject matter of Example 23, the instructions to cause the one or more processors to determine the one or more physical locations of the memory to be one or more available physical locations of the memory physically closest to the computing unit to execute the workload.

Example 27 includes the subject matter of Example 23, the instructions to cause the one or more processors to determine the one or more physical locations of the memory based on a state of the server architecture including at least one of: an amount of storage space available at one or more memory circuitries of the memory, a consumption rate of data from the one or more memory circuitries, an amount of storage space available at one of more of the memory circuitries, a consumption rate of data from one or more of the memory circuitries, a processing speed of one or more computing units of the server architecture, remaining processing times for workloads being or in a queue to be processed by one or more of the computing units.

Example 28 includes the subject matter of Example 27, the instructions to cause the one or more processors to determine the one or more physical locations of the memory based on historical information on a state of the server architecture.

Example 29 includes the subject matter of Example 27, the instructions to cause the one or more processors to determine the one or more physical locations of the memory based on information sent to it regarding a current state of the server architecture.

Example 30 includes the subject matter of Example 22, the instructions to cause the one or more processors to determine the memory based on load balancing for workloads as between computing units of the server architecture.

Example 31 includes the subject matter of Example 22, the instructions to cause the one or more processors to determine the memory based on a coordinated scheduling of data routing operations of the packet processing device with workload processing operations of one or more computing units of the server architecture.

Example 32 includes the subject matter of Example 31, the instructions to cause the one or more processors to route the data to the server architecture based on the coordinated scheduling by routing the data to the memory as the data is about to be consumed by the computing unit for execution of the workload.

Example 33 includes the subject matter of Example 32, the instructions to cause the one or more processors to base a routing of the data to the server architecture on the coordinated scheduling by using a Precision Time Measurement (PTM) protocol.

Example 34 includes the subject matter of Example 23, wherein the workload is a first workload corresponding to a first portion of a program, the computing unit to execute the first workload is a first computing unit, the data of the data packet is first data of the data packet, the one or more physical locations of the memory include a first physical location of the memory to store the first data, the instructions to cause the one or more processors to: determine a second computing unit of the server architecture to execute a second workload, the second workload corresponding to a second portion of the program; determine, based on the second computing unit, a second physical location of the one or more physical locations, the second physical location to store second data of the data packet for access by the second computing unit to execute the second workload; and route the second data to the server architecture for storage at the second physical location.

Example 35 includes the subject matter of Example 34, the instructions to cause the one or more processors to determine the first data and the second data based on respective types thereof.

Example 36 includes the subject matter of Example 22, the instructions to cause the one or more processors to determine the memory based on whether the data corresponds to a highly used data structure.

Example 37 includes the subject matter of Example 23, wherein the data packet is a first data packet, the computing unit is a first computing unit, the workload is a first workload, and the one or more physical locations are one or more first physical locations, the instructions to cause the one or more processors to: receive a second data packet; determine one or more second physical locations of the memory to store data of the second data packet; route the data of the second data packet to the server architecture for storage at the one or more second physical locations; determine, based on the one or more second physical locations, a second computing unit of the server architecture to execute a second workload on the data of the second data packet; and route instructions, based on the second workload, to the second computing unit.

Example 38 includes the subject matter of Example 23, the instructions to cause the one or more processors to receive a signal including information indicating the one or more physical locations, and to decode the signal to determine the one or more physical locations therefrom.

Example 39 includes the subject matter of Example 38, wherein the signal is part of the data packet.

Example 40 includes the subject matter of Example 22, the instructions to cause the one or more processors to route microservices to designated computing units of the server architecture, and to route data from data packets corresponding to the microservices to the memory based on the designated computing units.

Example 41 includes the subject matter of Example 22, the instructions to cause the one or more processors to move the data from one physical location to another physical location of the memory based on the workload moving from the computing unit to another computing unit of the server architecture.

Example 42 includes the subject matter of Example 22, wherein the packet processing device comprises one or more of: a network interface controller (NIC), a remote direct memory access (RDMA)-enabled NIC, SmartNIC, router, switch, forwarding element, infrastructure processing unit (IPU), or data processing unit (DPU).

Example 43 includes a method to be performed at a packet processing circuitry of a packet processing device, the method including: determining a computing unit of a server architecture, the computing unit to execute a workload; receiving a data packet including data to be used by the computing unit to execute the workload; determining, based on the computing unit to execute the workload, a memory of the server architecture to store the data for access by the computing unit to execute the workload; and routing the data to the server architecture for storage at the memory.

Example 44 includes the subject matter of Example 43, further including determining the memory of the server architecture by determining one or more physical locations of the memory.

Example 45 includes the subject matter of Example 44, further including determining the one or more physical locations based on an access distance between the one or more physical locations and the computing unit to execute the workload.

Example 46 includes the subject matter of Example 43, further including determining the memory by determining an association between at least one of the workload or the data with at least one of the computing unit or the memory.

Example 47 includes the subject matter of Example 44, further including determining the one or more physical locations of the memory to be one or more available physical locations of the memory physically closest to the computing unit to execute the workload.

Example 48 includes the subject matter of Example 44, further including determining the one or more physical locations of the memory based on a state of the server architecture including at least one of: an amount of storage space available at one or more memory circuitries of the memory, a consumption rate of data from the one or more memory circuitries, an amount of storage space available at one of more of the memory circuitries, a consumption rate of data from one or more of the memory circuitries, a processing speed of one or more computing units of the server architecture, remaining processing times for workloads being or in a queue to be processed by one or more of the computing units.

Example 49 includes the subject matter of Example 48, further including determining the one or more physical locations of the memory based on historical information on a state of the server architecture.

Example 50 includes the subject matter of Example 48, further including determining the one or more physical locations of the memory based on information sent to it regarding a current state of the server architecture.

Example 51 includes the subject matter of Example 43, further including determining the memory based on load balancing for workloads as between computing units of the server architecture.

Example 52 includes the subject matter of Example 43, further including determining the memory based on a coordinated scheduling of data routing operations of the packet processing device with workload processing operations of one or more computing units of the server architecture.

Example 53 includes the subject matter of Example 52, further including routing the data to the server architecture based on the coordinated scheduling by routing the data to the memory as the data is about to be consumed by the computing unit for execution of the workload.

Example 54 includes the subject matter of Example 53, further including basing a routing of the data to the server architecture on the coordinated scheduling by using a Precision Time Measurement (PTM) protocol.

Example 55 includes the subject matter of Example 44, wherein the workload is a first workload corresponding to a first portion of a program, the computing unit to execute the first workload is a first computing unit to execute the first workload, the data of the data packet is first data of the data packet, the one or more physical locations of the memory include a first physical location of the memory to store the first data, further including: determining a second computing unit of the server architecture to execute a second workload, the second workload corresponding to a second portion of the program; determining, based on the second computing unit, a second physical location of the one or more physical locations, the second physical location to store second data of the data packet for access by the second computing unit to execute the second workload; and routing the second data to the server architecture for storage at the second physical location.

Example 56 includes the subject matter of Example 55, further including determining the first data and the second data based on respective types thereof.

Example 57 includes the subject matter of Example 43, further including determining the memory based on whether the data corresponds to a highly used data structure.

Example 58 includes the subject matter of Example 44, wherein the data packet is a first data packet, the computing unit is a first computing unit, the workload is a first workload, and the one or more physical locations are one or more first physical locations, further including: receiving a second data packet; determining one or more second physical locations of the memory to store data of the second data packet; routing the data of the second data packet to the server architecture for storage at the one or more second physical locations; determining, based on the one or more second physical locations, a second computing unit of the server architecture to execute a second workload on the data of the second data packet; and routing instructions, based on the second workload, to the second computing unit.

Example 59 includes the subject matter of Example 44, further including receiving a signal including information indicating the one or more physical locations, and to decode the signal to determine the one or more physical locations therefrom.

Example 60 includes the subject matter of Example 59, wherein the signal is part of the data packet.

Example 61 includes the subject matter of Example 43, further including routing microservices to designated computing units of the server architecture, and to route data from data packets corresponding to the microservices to the memory based on the designated computing units.

Example 62 includes the subject matter of Example 43, further including routing the data from one physical location to another physical location of the memory based on the workload moving from the computing unit to another computing unit of the server architecture.

Example 63 includes the subject matter of Example 43, wherein the packet processing device comprises one or more of: a network interface controller (NIC), a remote direct memory access (RDMA)-enabled NIC, SmartNIC, router, switch, forwarding element, infrastructure processing unit (IPU), or data processing unit (DPU).

Example 64 includes a computing system of a data center, the computing system including: a server architecture including a plurality of computing units and a plurality of memory circuitries coupled to the computing units; and a packet processing device comprising: an interface to connect to the server architecture; and a packet processing circuitry coupled to the interface, the packet processing circuitry to: determine a computing unit of the server architecture, the computing unit to execute a workload; receive a data packet including data to be used by the computing unit to execute the workload; determine, based on the computing unit to execute the workload, a memory of the server architecture to store the data for access by the computing unit to execute the workload; and route the data to the server architecture for storage at the memory.

Example 65 includes the subject matter of Example 64, wherein the packet processing circuitry is to determine the memory of the server architecture by determining one or more physical locations of the memory.

Example 66 includes the subject matter of Example 65, wherein the packet processing circuitry is to determine the one or more physical locations based on an access distance between the one or more physical locations and the computing unit to execute the workload.

Example 67 includes the subject matter of Example 64, wherein the packet processing circuitry is to determine the memory by determining an association between at least one of the workload or the data with at least one of the computing unit or the memory.

Example 68 includes the subject matter of Example 65, wherein the packet processing circuitry is to determine the one or more physical locations of the memory to be one or more available physical locations of the memory physically closest to the computing unit to execute the workload.

Example 69 includes the subject matter of Example 65, wherein the packet processing circuitry is to determine the one or more physical locations of the memory based on a state of the server architecture including at least one of: an amount of storage space available at one or more memory circuitries of the memory, a consumption rate of data from the one or more memory circuitries, an amount of storage space available at one of more of the memory circuitries, a consumption rate of data from one or more of the memory circuitries, a processing speed of one or more of the computing units, remaining processing times for workloads being or in a queue to be processed by one or more of the computing units.

Example 70 includes the subject matter of Example 69, wherein the packet processing circuitry is to determine the one or more physical locations of the memory based on historical information on a state of the server architecture.

Example 71 includes the subject matter of Example 69, wherein the packet processing circuitry is to determine the one or more physical locations of the memory based on information sent to it regarding a current state of the server architecture.

Example 72 includes the subject matter of Example 64, wherein the packet processing circuitry is to determine the memory based on load balancing for workloads as between the computing units.

Example 73 includes the subject matter of Example 64, wherein the packet processing circuitry is to determine the memory based on a coordinated scheduling of data routing operations of the packet processing circuitry with workload processing operations of one or more of the computing units.

Example 74 includes the subject matter of Example 73, wherein the packet processing circuitry is to route the data to the server architecture based on the coordinated scheduling by routing the data to the memory as the data is about to be consumed by the computing unit for execution of the workload.

Example 75 includes the subject matter of Example 74, wherein the packet processing circuitry is to base a routing of the data to the server architecture on the coordinated scheduling by using a Precision Time Measurement (PTM) protocol.

Example 76 includes the subject matter of Example 65, wherein the workload is a first workload corresponding to a first portion of a program, the computing unit to execute the first workload is a first computing unit to execute the first workload, the data of the data packet is first data of the data packet, the one or more physical locations of the memory include a first physical location of the memory to store the first data, the packet processing circuitry to: determine a second computing unit of the server architecture to execute a second workload, the second workload corresponding to a second portion of the program; determine, based on the second computing unit, a second physical location of the one or more physical locations, the second physical location to store second data of the data packet for access by the second computing unit to execute the second workload; and route the second data to the server architecture for storage at the second physical location.

Example 77 includes the subject matter of Example 76, wherein the packet processing circuitry is to determine the first data and the second data based on respective types thereof.

Example 78 includes the subject matter of Example 64, wherein the packet processing circuitry is to determine the memory based on whether the data corresponds to a highly used data structure.

Example 79 includes the subject matter of Example 65, wherein the data packet is a first data packet, the computing unit is a first computing unit, the workload is a first workload, and the one or more physical locations are one or more first physical locations, the packet processing circuitry to: receive a second data packet; determine one or more second physical locations of the memory to store data of the second data packet; route the data of the second data packet to the server architecture for storage at the one or more second physical locations; determine, based on the one or more second physical locations, a second computing unit of the server architecture to execute a second workload on the data of the second data packet; and route instructions, based on the second workload, to the second computing unit.

Example 80 includes the subject matter of Example 65, wherein the packet processing circuitry is to receive a signal including information indicating the one or more physical locations, and to decode the signal to determine the one or more physical locations therefrom.

Example 81 includes the subject matter of Example 80, wherein the signal is part of the data packet.

Example 82 includes the subject matter of Example 64, wherein the packet processing circuitry is to route microservices to designated computing units of the server architecture, and to route data from data packets corresponding to the microservices to the memory based on the designated computing units.

Example 83 includes the subject matter of Example 64, wherein the packet processing circuitry is to move the data from one physical location to another physical location of the memory based on the workload moving from the computing unit to another computing unit of the server architecture.

Example 84 includes the subject matter of Example 64, wherein the packet processing device comprises one or more of: a network interface controller (NIC), a remote direct memory access (RDMA)-enabled NIC, SmartNIC, router, switch, forwarding element, infrastructure processing unit (IPU), or data processing unit (DPU).

Example 85 includes an apparatus including means for performing a method according to any one of Examples 43-63.

Example 86 includes a computer readable storage medium including code which, when executed, is to cause a machine to perform any of the methods of Examples 43-63.

Example 87 includes a method to perform the functionalities of any one of Examples 43-63.

Example 88 includes a non-transitory computer-readable storage medium comprising instructions stored thereon, that when executed by one or more processors of a packet processing device, cause the one or more processors to perform the functionalities of any one of Examples 43-63.

Example 89 includes means to perform the functionalities of any one of Examples 43-63.

The invention claimed is:

1. An apparatus of a packet processing device, the apparatus comprising:

a network interface to receive data packets from a network, and a host interface to connect to a server architecture, the server architecture having a plurality of computing units and a plurality of memory circuitries coupled to the computing units, the plurality of memory circuitries including a plurality of caches that correspond to a respective plurality of physical cache locations; and a packet processing circuitry coupled to the network interface and to the host interface, the packet processing circuitry to:

determine a computing unit of the server architecture, the computing unit to execute a workload;

receive, through the network interface, a data packet including data to be used by the computing unit to execute the workload;

select, from the plurality of memory circuitries, a memory circuitry having a physical cache location with a shortest access distance to a physical location of the computing unit to execute the workload; and route the data to the server architecture through the host interface for storage at the memory circuitry for access by the computing unit to execute the workload.

2. The apparatus of claim 1, wherein the packet processing circuitry is to select the memory circuitry of the server architecture by determining the plurality of physical cache locations.

3. The apparatus of claim 2, wherein the packet processing circuitry is to determine the plurality of physical cache locations based on an access distance between the physical cache locations and the physical location of the computing unit to execute the workload.

4. The apparatus of claim 1, wherein the packet processing circuitry is to select the memory circuitry by determining an association between at least one of the workload or the data with at least one of the computing unit or the memory circuitry.

5. The apparatus of claim 2, wherein the packet processing circuitry is to determine the plurality of physical cache locations to be one or more available physical cache locations physically closest to the physical location of the computing unit to execute the workload.

6. The apparatus of claim 2, wherein the packet processing circuitry is to determine the plurality of physical cache locations based on a state of the server architecture including at least one of: an amount of storage space available at one or more of the plurality of memory circuitries, a consumption rate of data from the plurality of memory circuitries, an amount of storage space available at the plurality of memory circuitries, a consumption rate of data from the plurality of memory circuitries, a processing speed of one or more of the computing units, or remaining processing times for workloads being or in a queue to be processed by one or more of the computing units.

7. The apparatus of claim 6, wherein the packet processing circuitry is to determine the physical cache locations based on historical information on a state of the server architecture.

8. The apparatus of claim 6, wherein the packet processing circuitry is to select the one or more physical cache locations of the memory circuitry based on information sent to it regarding a current state of the server architecture.

9. A non-transitory computer-readable storage medium comprising instructions stored thereon, that when executed by one or more processors of a packet processing device, cause the one or more processors to:

determine a computing unit of a server architecture, the computing unit to execute a workload;

receive, through a network interface of the packet processing device, a data packet including data to be used by the computing unit to execute the workload;

select, from a plurality of memory circuitries of the server architecture, a memory circuitry having a physical cache location with a shortest access distance to a physical location of the computing unit to execute the workload; and route the data to the server architecture through a host interface of the packet processing device for storage at the memory circuitry for access by the computing unit to execute the workload.

10. The storage medium of claim 9, the instructions to cause the one or more processors to select the memory circuitry of the server architecture by determining a plurality of physical cache locations corresponding to respective ones of the plurality of memory circuitries.

11. The storage medium of claim 10, the instructions to cause the one or more processors to determine the plurality of physical cache locations based on an access distance between the plurality of physical cache locations and the physical location of the computing unit to execute the workload.

12. The storage medium of claim 9, the instructions to cause the one or more processors to select the memory circuitry by determining an association between at least one of the workload or the data with at least one of the computing unit or the memory circuitry.

13. The storage medium of claim 9, the instructions to cause the one or more processors to select the memory circuitry based on load balancing for workloads as between computing units of the server architecture.

14. The storage medium of claim 9, the instructions to cause the one or more processors to select the memory circuitry based on a coordinated scheduling of data routing operations of the packet processing device with workload processing operations of one or more computing units of the server architecture.

15. A method to be performed at a packet processing circuitry of a packet processing device, the method including:

determining a computing unit of a server architecture, the computing unit to execute a workload;

receiving, through a network interface of the packet processing device, a data packet including data to be used by the computing unit to execute the workload;

selecting, from a plurality of memory circuitries of the server architecture, a memory circuitry having a physical cache location with a shortest access distance to a physical location of the computing unit to execute the workload; and routing the data to the server architecture through a host interface of the packet processing device for storage at the memory circuitry for access by the computing unit to execute the workload.

16. The method of claim 15, further including selecting the memory circuitry of the server architecture by determining a plurality of physical cache locations corresponding to respective ones of the plurality of memory circuitries.

17. The method of claim 16, wherein the workload is a first workload corresponding to a first portion of a program, the computing unit to execute the first workload is a first computing unit to execute the first workload, the data packet is a first data packet, and the data of the data packet is first data of the data packet, the memory circuitry is a first memory circuitry, and the physical cache location is a first physical cache location, further including:

determining a second computing unit of the server architecture to execute a second workload, the second workload corresponding to a second portion of the program;

receiving, through the network interface of the packet processing device, a second data packet including second data to be used by the second computing unit to execute the second workload;

selecting, from the plurality of memory circuitries of the server architecture, a second memory circuitry having a second physical cache location with a shortest access distance to a physical location of the second computing unit to execute the second workload; and routing the second data to the server architecture through the host interface of the packet processing device for storage at the second memory circuitry for access by the second computing unit to execute the second workload.

18. The method of claim 17, further including determining the first data and the second data based on respective types thereof.

19. A computing system of a data center, the computing system including:

a server architecture including a plurality of computing units and a plurality of memory circuitries coupled to the computing units, the plurality of memory circuitries including a plurality of caches that correspond to a respective plurality of physical cache locations; and a packet processing device comprising:

a network interface to receive data packets from a network, and a host interface to connect to the server architecture; and a packet processing circuitry coupled to the network interface and to the host interface, the packet processing circuitry to:

determine a computing unit of the server architecture, the computing unit to execute a workload;

receive, through the network interface, a data packet including data to be used by the computing unit to execute the workload;

select, from the plurality of memory circuitries, a memory circuitry having a physical cache location with a shortest access distance to a physical location of the computing unit to execute the workload; and route the data to the server architecture through the host interface for storage at the memory circuitry for access by the computing unit to execute the workload.

20. The computing system of claim 19, wherein the packet processing circuitry is to select the memory circuitry of the server architecture by determining the plurality of physical cache locations.

* * * * *